US010142853B2

United States Patent
Tarlazzi

(10) Patent No.: US 10,142,853 B2
(45) Date of Patent: Nov. 27, 2018

(54) AUTOMATED DISTRIBUTED ANTENNA SYSTEM SELF-CONFIGURATION

(71) Applicant: CommScope Technologies LLC, Hickory, NC (US)

(72) Inventor: Luigi Tarlazzi, Bagnacavallo (IT)

(73) Assignee: CommScope Technologies LLC, Hickory, NC (US)

( * ) Notice: Subject to any disclaimer, the term of this patent is extended or adjusted under 35 U.S.C. 154(b) by 167 days.

(21) Appl. No.: 15/320,600

(22) PCT Filed: Jun. 19, 2015

(86) PCT No.: PCT/US2015/036772
§ 371 (c)(1),
(2) Date: Dec. 20, 2016

(87) PCT Pub. No.: WO2015/196129
PCT Pub. Date: Dec. 23, 2015

(65) Prior Publication Data
US 2017/0201891 A1 Jul. 13, 2017

Related U.S. Application Data

(60) Provisional application No. 62/014,939, filed on Jun. 20, 2014.

(51) Int. Cl.
*H04W 4/00* (2018.01)
*H04W 16/18* (2009.01)
(Continued)

(52) U.S. Cl.
CPC .......... *H04W 16/18* (2013.01); *H04L 5/0048* (2013.01); *H04W 16/32* (2013.01); *H04W 24/02* (2013.01);
(Continued)

(58) Field of Classification Search
CPC ... H04W 16/18; H04W 24/08; H04W 72/042; H04W 16/32; H04W 88/085; H04W 24/02; H04L 5/0048
See application file for complete search history.

(56) References Cited

U.S. PATENT DOCUMENTS

2011/0021205 A1 1/2011 Horneman et al.
2013/0121703 A1 5/2013 Kummetz et al.
(Continued)

FOREIGN PATENT DOCUMENTS

| WO | 2013040589 | 3/2013 |
|----|------------|--------|
| WO | 2013116802 | 8/2013 |
| WO | 2014014689 | 1/2014 |

OTHER PUBLICATIONS

International Search Authority, "International Search Report and Written Opinion for PCT Application No. PCT/US2015/036772", dated Oct. 8, 2015, pp. 1-12, Published in: WO.
(Continued)

*Primary Examiner* — Afshawn M Towfighi
(74) *Attorney, Agent, or Firm* — Fogg & Powers LLC

(57) ABSTRACT

Certain features relate to systems and methods for planning and optimizing a distributed antenna system ("DAS") based on measurements taken from the radio environment surrounding the DAS. An operation and management system can determine a mapping of external cells based on measurements of downlink signals taken by a measurement subsystem. The operation and management system can determine a mapping of internal cells as well as a neighboring cell relation table. The DAS element management system or network operator can configure the DAS based on the mapping of external cells, mapping of internal cells, and the cell relation table. Additionally, based on neighboring cell signal power measurements taken by user devices, the a common interface between the DAS and the radio access (Continued)

network can determine a radio environment map estimating positions of the user devices connected to the DAS.

20 Claims, 14 Drawing Sheets

(51) Int. Cl.
  *H04W 24/02* (2009.01)
  *H04W 88/08* (2009.01)
  *H04W 16/32* (2009.01)
  *H04L 5/00* (2006.01)
  *H04W 24/08* (2009.01)
  *H04W 72/04* (2009.01)

(52) U.S. Cl.
  CPC ......... *H04W 24/08* (2013.01); *H04W 72/042* (2013.01); *H04W 88/085* (2013.01)

(56) References Cited

U.S. PATENT DOCUMENTS

| 2015/0341814 A1* | 11/2015 | Yu ........................... H04B 7/04 370/252 |
| 2017/0250765 A1* | 8/2017 | Hasarchi ................. H04L 25/02 |

OTHER PUBLICATIONS

European Patent Office, "Extended European Search Report for EP Application No. 15809343.5", "Foreign Counterpart to U.S. Appl. No. 15/320,600", dated Jan. 19, 2018, pp. 1-9, Published in: EP.

* cited by examiner

| RU VS. EXTERNAL CELL | RU#5 | RU#9 | RU#13 | RU#4 | RU#6 | ... | RU#16 |
|---|---|---|---|---|---|---|---|
| CELL#5 | EXTERNAL PILOT POWER | EXTERNAL PILOT POWER | EXTERNAL PILOT POWER | , | , | , | , |
| CELL#6 | , | , | , | , | , | , | , |
| CELL#7 | , | , | , | , | , | , | EXTERNAL PILOT POWER |

FIG. 4

| RU vs. INTERNAL CELL | RU#1 | RU#2 | RU#3 | RU#4 | RU#5 | ... | RU#16 |
|---|---|---|---|---|---|---|---|
| CELL#1 | INTERNAL PILOT POWER | INTERNAL PILOT POWER | . | . | . | . | . |
| CELL#2 | . | . | INTERNAL PILOT POWER | INTERNAL PILOT POWER | . | . | . |
| CELL#3 | . | . | . | . | . | . | . |
| CELL#4 | . | . | . | . | . | . | INTERNAL PILOT POWER |

FIG. 5

| CELL VS. RU NEIGHBOR RELATION | RU#1 | RU#2 | RU#3 | RU#4 | RU#5 | ... | RU#16 |
|---|---|---|---|---|---|---|---|
| CELL#1 | | | NEIGHBOR | | | | |
| CELL#2 | | NEIGHBOR | | | | | |
| CELL#3 | | | | | NEIGHBOR | | |
| CELL#4 | | | | | | | |
| CELL#5 | NEIGHBOR | | | | NEIGHBOR | | |
| CELL#6 | | | | | | | |
| CELL#7 | | | | | | | NEIGHBOR |

FIG. 6

| CELL VS. UE MAPPING | UE#1 | UE#2 | UE#3 |
|---|---|---|---|
| CELL#1 | -90 | -90 | -85 |
| CELL#2 | -95 | -125 | -125 |
| CELL#3 | -125 | -95 | -125 |

FIG. 12

| RU VS. CELL EDGE MAPPING | RU#1 | RU#2 | RU#3 | RU#4 | RU#5 |
|---|---|---|---|---|---|
| CELL#1 | | | | | |
| CELL#2 | -110 | -125 | -100 | -125 | -125 |
| CELL#3 | -125 | -110 | -125 | -100 | -125 |

FIG. 13

| RU VS. UE MAPPING | RU#1 | RU#2 | RU#3 | RU#4 | RU#5 |
|---|---|---|---|---|---|
| UE#1 | (-95)-(-110)<br>(-125)-(-125) | (-95)-(-125)<br>(-125)-(-110) | (-95)-(-100)<br>(-125)-(-125) | (-95)-(-125)<br>(-125)-(-100) | (-95)-(-125)<br>(-125)-(-125) |
| UE#2 | (-125)-(-110)<br>(-95)-(-125) | (-125)-(-125)<br>(-95)-(-110) | (-125)-(-100)<br>(-95)-(-125) | (-125)-(-125)<br>(-95)-(-100) | (-125)-(-125)<br>(-95)-(-125) |
| UE#3 | (-125)-(-110)<br>(-125)-(-125) | (-125)-(-125)<br>(-125)-(-110) | (-125)-(-100)<br>(-125)-(-125) | (-125)-(-125)<br>(-125)-(-100) | (-125)-(-125)<br>(-125)-(-125) |

FIG. 14

AUTOMATED DISTRIBUTED ANTENNA SYSTEM SELF-CONFIGURATION

CROSS-REFERENCE TO RELATED APPLICATIONS

This application is a U.S. National Stage application of PCT Application Serial No. PCT/US2015/036772, filed Jun. 19, 2015, and titled "AUTOMATED DISTRIBUTED ANTENNA SYSTEM SELF-CONFIGURATION," which claims the benefit of U.S. Provisional Application Ser. No. 62/014,939, filed Jun. 20, 2014 and titled "Automated Distributed Antenna System Self-Configuration," the contents of all of which are hereby incorporated herein by reference.

TECHNICAL FIELD

The disclosure relates generally to telecommunications and, more particularly (although not necessarily exclusively), to automatic self-configuration of a telecommunications network by determining the radio environment of the telecommunications network.

BACKGROUND

A distributed antenna system ("DAS") can include one or more head-end units and multiple remote units coupled to each head-end unit. A DAS can be used to extend wireless coverage in an area. Head-end units can be connected to base stations. A head-end unit can receive downlink signals from the base station and distribute downlink signals in analog or digital format to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to a head-end unit. The head-end unit can transmit uplink signals to the serving base stations.

In a simulcast mode, each downlink cell signal associated with a base station can be distributed across multiple DAS remote units such that multiple DAS remote units radiate the same downlink cell signal. It can be difficult in the simulcast mode to determine neighboring relationships down to each remote unit between cells inside the DAS and cells outside the DAS. An internal cell can refer to a cell associated with a base station connected to the DAS. An external cell can refer to any other cell associated with base stations not connected to the DAS, which can include cells belonging to a cellular communications network. In a scenario in which a DAS is located, for example, in a building, the radio footprint of external cells may overlap with the radio footprint of the internal cells associated with the remote units inside the building. Using the same cell ID for both an internal cell and an external cell can create a cell ID conflict which can degrade the overall network performance.

SUMMARY

In one aspect, a method is provided. The method can include determining a mapping of external cells from measurements of external downlink signals received by a remote unit of a distributed antenna system. The remote unit provides wireless communication within a coverage zone. The method can also include determining a mapping of internal cells from measurements of internal downlink signals provided by base stations communicatively coupled to a head-end unit of the distributed antenna system. The method can further include determining relation information of neighboring cells. Neighboring cells include radio footprints that overlap with the coverage zone of the remote unit. The method can also include configuring the distributed antenna system and the base stations based on the mapping of external cells, the mapping of internal cells, and the relation information of neighboring cells.

In another aspect, a head-end unit is provided. The head-end unit can include a measurement subsystem configured to measure external downlink signals detected by a remote unit of a distributed antenna system and measure internal downlink signals provided from an internal base station communicatively coupled to the distributed antenna system. The head-end unit can also include an operation and management system configured to determine, from the external downlink signals, a mapping of external cells detected by the remote unit. The operation and management system is also configured to determine, from the internal downlink signals, a mapping of internal cells, and determine relation information of neighboring cells. Neighboring cells include radio footprints that overlap with a coverage zone of the remote unit. The head-end unit can be configured to provide wireless communication from the internal base station to the remote unit and additional remote units of the distributed antenna system.

In another aspect, a distributed antenna system is provided. The distributed antenna system can include one or more remote units configured to provide wireless communication to user devices within a coverage zone. The distributed antenna system can also include a head-end unit communicatively coupled to the one or more remote units. The head-end unit includes an operation and management system configured to determine a mapping of external cells, a mapping of internal cells, and relation information of neighboring cells for each remote unit in the distributed antenna system. The operation and management system also provides the mapping of external cells, the mapping of internal cells, and the relation information of neighboring cells to an element management system communicatively coupled to the head-end unit.

BRIEF DESCRIPTION OF THE DRAWINGS

FIG. 4 is a table mapping examples of internal cell pilot power levels for each remote unit in a distributed antenna system according to one aspect of the present disclosure.

FIG. 5 is a table mapping examples of external cell pilot power levels for each remote unit in a distributed antenna system according to one aspect of the present disclosure.

FIG. 6 is a table indicating examples of neighboring cells for each remote unit in a distributed antenna system according to one aspect of the present disclosure.

FIG. 12 is a table indicating examples of power levels measured by user devices in a DAS according to one aspect of the present disclosure.

FIG. 13 is a table indicating examples of power levels measured by remote units in a DAS according to one aspect of the present disclosure.

FIG. 14 is a table indicating examples of comparisons of power levels measured by remote units in a DAS and by user devices communicating with a DAS according to one aspect of the present disclosure.

DETAILED DESCRIPTION

Figure 1:
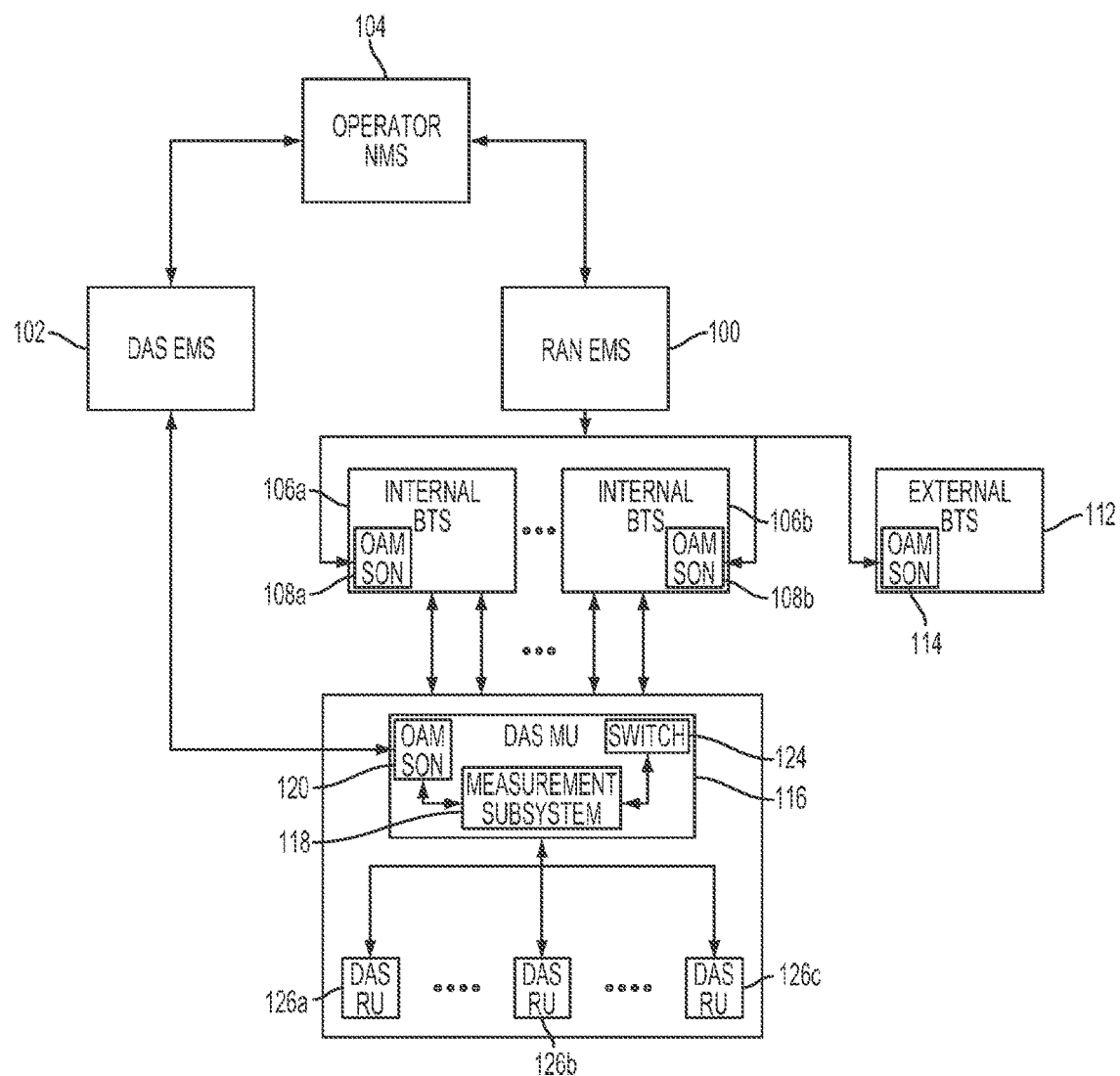
FIG. 1 is a block diagram showing an example of management architecture for a radio access network ("RAN") and distributed antenna system ("DAS") with a measurement subsystem included in a head-end unit of the DAS according to one aspect of the present disclosure.

Certain aspects and features are directed to automated methods and systems for planning and optimizing a telecommunications system, such as a distributed antenna system ("DAS"), based on measurements derived from the radio environment surrounding the DAS. For example, a DAS can be part of a larger radio access network ("RAN") where some of the remote units and user devices that are part of the DAS fall within overlapping radio coverage zones of cells outside of the DAS. Remote units and user devices within the DAS can detect incoming downlink signals from both internal base stations that are connected to the DAS and external base stations that are part of other telecommunications networks and have overlapping radio coverage zones.

The DAS may not have control over the configuration and cell identifier ("ID") selection of the cells outside of the DAS. Certain aspects of the present disclosure relate to automatically detecting the radio environment around the DAS and identifying areas of overlapping radio footprints. This information can be provided to a network management system of the RAN for planning and automatically adjusting the layout of cells and cell IDs within the DAS. For example, when assigning cell IDs, the network management system can avoid assigning the detected cell IDs of cells outside the DAS as the cell IDs internal to the DAS. Automatically configuring the DAS based on the detected radio environment map can mitigate the likelihood of signaling errors resulting from of conflicting cell ID selections.

For example, a measurement subsystem and an operation and management system can be used to identify cells that are internal to the DAS and cells that are external to the DAS and determine areas of overlapping radio coverage. The measurement subsystem and operation and management system can also determine, for each remote unit in the DAS, any neighboring cells that have overlapping radio footprints with the coverage zone of the remote unit. The internal/external cell ID information and the neighboring cell information can be used to automatically plan and adjust the layout of cell IDs within the DAS. The layout of the DAS cells can be configured, for example, such that the internal cell IDs do not conflict with external cell IDs assigned by the radio access network.

For example, in one aspect for automated DAS self-configuration, the head-end unit can instruct all remote units of the DAS to operate in a downlink monitoring mode, where remote units detect incoming signals on downlink frequency bands in which the DAS operates. A DAS measurement system, which can be located in the head-end unit, can detect parameters from the downlink signals from each remote unit. The downlink signal parameters can include, for example, the pilot power (e.g., LTE RSRP pilot tone power), the physical cell ID of the cell associated with the transmission, the global cell ID, the mobile country code, mobile network code, carrier technology (e.g., LTE, UMTS, etc.) bandwidth of the signal, and the frequency of the signal. An operation and management system, which can also be located in the head-end unit, can use the detected parameters to generate an external cell table indicating which remote units detected downlink signals from external cells.

The operation and management system in the DAS can also generate an internal cell ID table by measuring the downlink input signal from each base station connected to the DAS. The DAS measurement subsystem can detect the internal cell IDs and signal pilot power for the internal cells. This information can be used to generate an internal cell table that indicates which remote units are included in each cell. The internal cell table and the external cell table can be combined to create a neighboring cell relationship table, which can define the relationships between cells and be used to automatically configure the DAS by optimizing the internal cell ID selection in order to avoid cell ID collision.

In some aspects, the DAS measurement subsystem can detect and measure signal interference that may be caused by conflicting frequency bands used by both the internal cell and a neighboring external cell. The DAS can use the measured signal interference to determine which carrier frequencies conflict. In response, the operation and management system can adjust the carrier frequencies used in the DAS to avoid conflicts with external carrier frequencies.

In another aspect, additional measurements can be taken at each user device connected to the DAS. User devices can be instructed by the base station to perform measurements of downlink signal parameters similar to the measurements performed by the DAS measurement system. The base station can provide the measurements performed by the user devices to the RAN element management system and network management system. The RAN network management system, in turn, can collect and compare the measurements of downlink signal parameters from the user devices as well as the measurements from the DAS measurement system. The RAN network management system can use the comparison of measured downlink signal parameters to estimate relative positions of each user device.

In another aspect, the measurements taken by each user device can be compared with the internal cell and external cell information in order to estimate the relative position of the user devices in relation to each remote unit in the DAS. This can help determine traffic hotspots in the DAS, allowing a system operator to increase DAS coverage where needed.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

FIG. 1 is a block diagram of an example of a management system for a RAN and a DAS network suitable for implementing the subject matter described herein. The management system can include a RAN element management system 100, a DAS element management system 102, and an operator network management system 104. The management system shown in FIG. 1 can be connected to operators serving various network formats (e.g., GSM, CDMA, UMTS, LTE). While a single operator network management system 104 is shown in FIG. 1 as an example, network management systems of multiple network operators or the element management system of any RAN technology can be included in the management system of FIG. 1 without departing from the scope of the subject matter described herein.

The operator network management system 104 can communicate with the DAS element management system 102 and the RAN element management system 100 via a north-bound interface. A north-bound interface is an interface that allows a component of a telecommunications system to communicate with a higher-level component in the network architecture. The DAS element management system 102 can be coupled to a DAS that includes a head-end unit 116 coupled to one or more remote units 126a-c. The RAN element management system 100 can be coupled to one or more base stations present in the RAN, such as internal base stations 106a-b and external base station 112. The RAN element management system 100 can communicate with the internal base stations 106a-b and the external base station 112 via a south-bound interface. Internal base stations 106a-b can provide wireless communication to components of the DAS, such as the DAS remote units 126a-c. The external base station 112 can provide communication to any device or networking system not connected to the DAS. Accordingly, network cells associated with one of the internal base stations 106a-b coupled to the DAS platform can be referred as internal cells, whereas all other cells coupled to external base stations, such as external base station 112, can be referred to as external cells.

The internal base stations 106a-b can provide wireless communication to remote units 126a-c via the head-end unit 116. Any suitable communication link can be used for communication between internal base stations 106a-b and head-end unit 116. Examples of a suitable communication link include a direct connection or a wireless connection. A direct connection can include, for example, a connection via a copper, optical fiber, or other suitable communication medium. In some aspects, the head-end unit 116 can include an external repeater or internal RF transceiver to communicate with the internal base stations 106a-b. In some aspects, internal base stations 106a-b can be communicatively coupled to the head-end unit 116 with via a digital baseband interface instead of a radio frequency interface. An example of a digital baseband interface is an interface that follows the common public radio interface (CPRI) standard. When communicatively coupled with a digital baseband interface, the head-end unit 116 can communicate with the internal base stations 106a-b by communicating I/Q samples of radiated radio frequency signals.

Downlink signals from the internal base stations 106a-b are provided to the head-end unit 116, which can provide the downlink wireless communication to one or more of the intended remote units 126a-c. Uplink signals sent from the remote units 126a-c are provided to the head-end unit 116, which can provide the uplink communication signals to the appropriate base station 106a-b.

The DAS element management system 102 and RAN element management system 100 can manage various telecommunications network elements for the RAN and DAS, respectively. For example, the DAS head-end unit 116 can provide certain parameters, such as measured cell ID values of neighboring cells and pilot power levels of neighboring cells to the DAS element management system 102 and the operator network management system 104. The DAS element management system 102 and the operator network management system 104 can use the received parameters to determine the optimal cell ID selection values for the DAS. The DAS element management system 102 can configure aspects of the DAS by sending commands to an operation and management/self-optimizing network unit 120 (OAM-SON unit) included in the head-end unit 116. Each internal base station 106a-b and the external base station 112 can include OAM-SON units 108a-b and 114, respectively, for communicating with the RAN element management system 100. In other aspects, the OAM-SON units 108a-b and 114 can be fully decoupled from the internal base stations 106a-b and external base station 112. In some aspects, system configuration and control messages can be exchanged between the OAM-SON units 108a-b of internal base stations 106a-b and the OAM-SON unit 120 of the head-end unit 116.

The DAS head-end unit 116 can include a measurement subsystem 118 that includes signal-processing circuitry associated with receiving, demodulating, and decoding downlink cell signals from internal base stations 106a-b coupled to the DAS and external base station 112. The measurement subsystem 118 can detect and decode downlink signals in various network formats (e.g., GSM, CDMA, UMTS, LTE). Downlink signals from internal base stations 106a-b can be provided to the measurement subsystem 118 via the digital wired or RF cable interfaces between internal base stations 106a-b and head-end unit 116. If remote units 126a-c are within the cell range of external base station 112, then remote units can detect over-the-air downlink signals from external base station 112 and provide the detected downlink signals to the measurement subsystem 118.

The signal strength of downlink signals from the external base station 112 can vary based on interference and noise from various other sources. To detect weak downlink signals from the external base station 112, the sensitivity of the measurement subsystem 118 can be increased by stopping downlink transmissions from the remote units 126a-c and selectively muting the detection of downlink signals from remote units other than a target remote unit. The target remote unit can be rotated until downlink signals from all remote units 126a-c are measured. For example, the measurement subsystem 118 can mute remote units 126b-c and measure downlink signals detected from target remote unit 126a. The measurement subsystem 118 can mute remote units 126a, 126c and measure downlink signals detected from target remote unit 126b. Finally, the measurement subsystem 118 can mute remote units 126a-b and measure downlink signals detected from target remote unit 126c. Muting can be performed by the switch 124. Using the switch 124 or similar device to selectively mute signals from remote units other than a target unit can avoid adding together interference associated from multiple signals, thereby increasing the sensitivity of the measurement subsystem 118.

Figure 7:
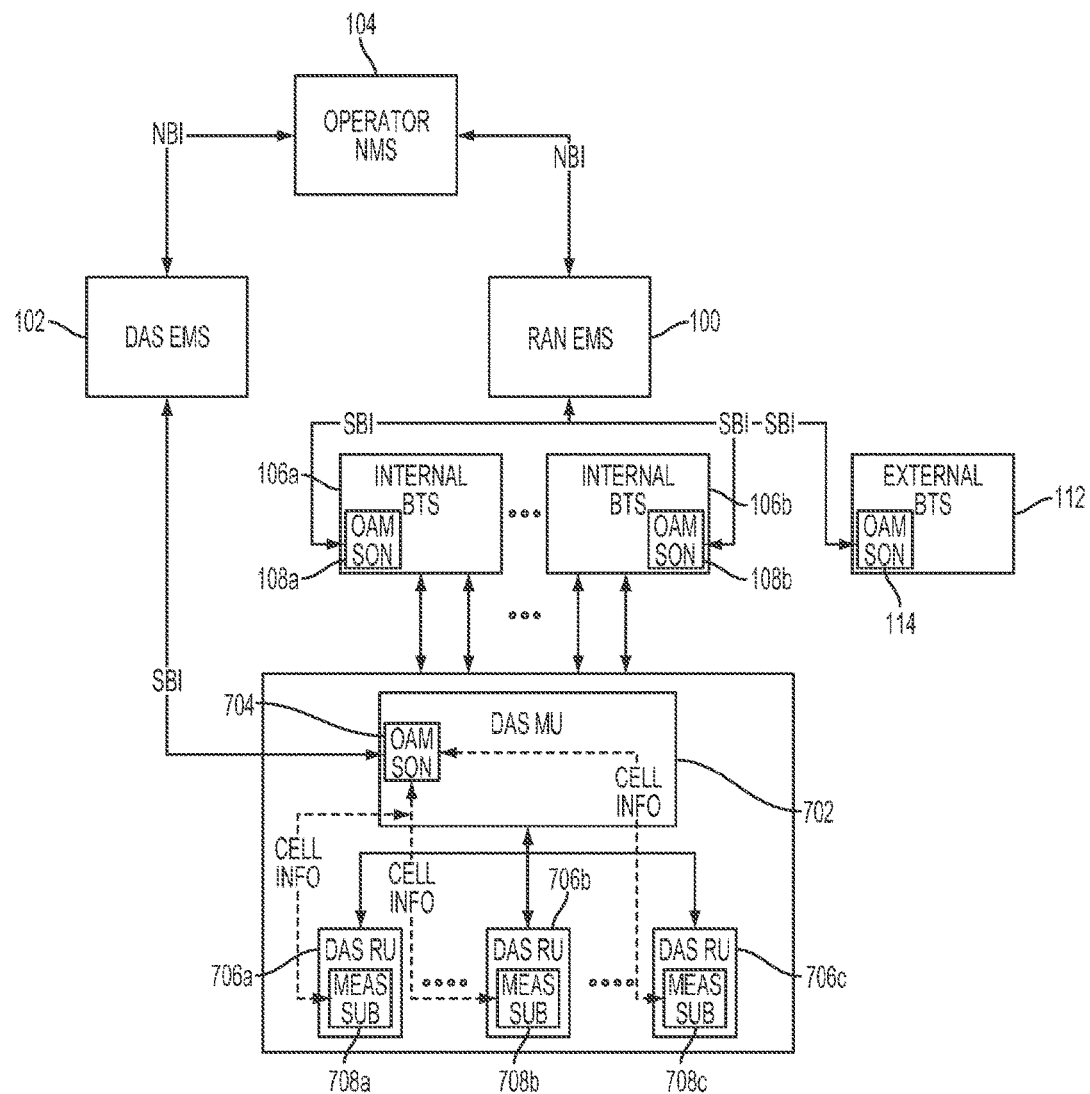
FIG. 7 is a block diagram showing an example of management architecture for a RAN and DAS with measurement subsystems included in the remote units of the DAS according to one aspect of the present disclosure.

While certain aspects and features with respect to FIG. 1 depict the measurement subsystem 118 as part of the head-end unit 116, in other aspects, each remote unit can also include a measurement subsystem. For example, FIG. 7 is a block diagram illustrating a management system for a RAN and DAS with measurement subsystems in each remote unit according to one aspect. The management system can include an operator network management system 104, DAS element management system 102, and RAN element management system 100, all of which operate in a similar manner as described with respect to FIG. 1. The management system shown in FIG. 7 can also include internal base stations 106a-b connected to a DAS and external base station 112. The DAS shown in FIG. 7 can include a head-end unit 702 with an OAM-SON unit 704, the head-end unit 702 configured to provide communication from internal base stations 106a-b to remote units 706a-c. Each remote unit 706a-c can include a measurement subsystem 708a-c. The measurement subsystem 708a-c can function in a similar manner to measurement subsystem 118 discussed with respect to FIG. 1. For example, to detect weak downlink signals from external base station 112, sensitivity of the measurement subsystems 708a-c can be increased by stopping downlink transmissions from the remote units 706a-c. Unlike the measurement subsystem 118 described with respect to FIG. 1, however, each measurement subsystem 708a-c can respectively detect signals from external base station 112 without muting the detection of downlink signals transmitted by the other remote units. Each remote unit 708a-c can detect downlink signals in parallel.

Downlink signals broadcasted by internal base stations 106a-b and external base station 112 can include system information parameters according to the relevant radio resource control protocol. System information parameters can include, but are not limited to, pilot tone power (e.g., LTE RSRP), physical cell ID, and global cell ID. The measurement subsystem 118 can detect the system information parameters to determine which physical cell IDs correspond to internal cells and which correspond to external cells. The measurement subsystem 118 can also determine neighboring cell relations for each remote unit 126a-c (e.g., which internal cells and external cells are neighboring cells for each remote unit) and provide this information to the DAS element management system 102. For example, internal cells corresponding to the coverage zones of internal base stations 106a-b can overlap with external cells corresponding to coverage zones of external base station 112. The cell relations determined by the measurement subsystem 118 can be used by the DAS element management system 102 and the operator network management system 104 to optimally configure the cell IDs in the network.

Figure 2:
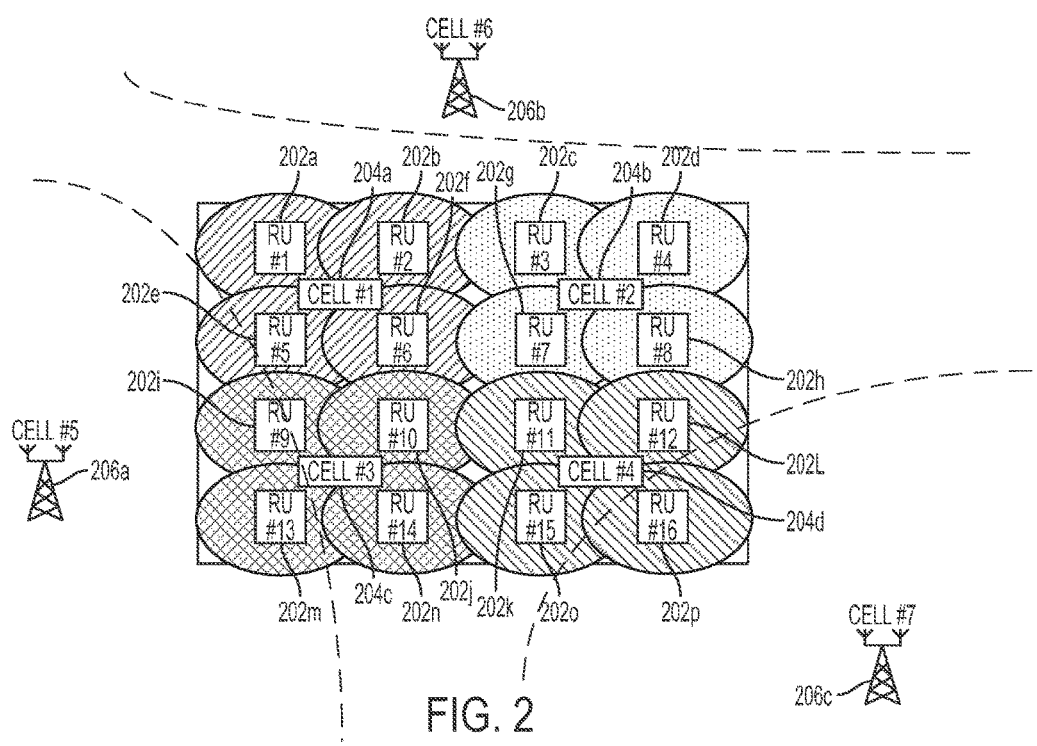
FIG. 2 is a schematic diagram showing an example of a radio coverage map of remote units communicating with internal cells according to one aspect of the present disclosure.

For example, FIG. 2 shows an example of a network involving sixteen remote units 202a-p deployed within overlapping coverage zones from internal cells 204a-d and external cells 206a-c. Four internal cells 204a-d are associated with signals from internal base stations connected to a DAS and uniformly allocated across the sixteen remote units 202a-p. External cells 206a-c are associated with signals from other networks and external base stations not connected to the DAS. The radio footprint of each DAS remote unit 202a-p is shown for the internal cells 204a-d along with the radio footprints of the external cells 206a-c. The radio footprint of some cells overlap with the radio footprint of other cells. The depicted signal fronts of the external cells 206a-c are related to a minimum power level threshold, which can be detected by the DAS measurement subsystem. For example, remote units 202i, 202m, located within the radio footprint of internal cell 204c, can also detect downlink signals in external cell 206a. Remote unit 202e, located within the radio footprint of internal cell 204a, can also detect downlink signals in external cell 206a. The remote unit 202p, located within the coverage of internal cell 204d, can also detect downlink signals from any external base station in external cell 206c.

Figure 3:
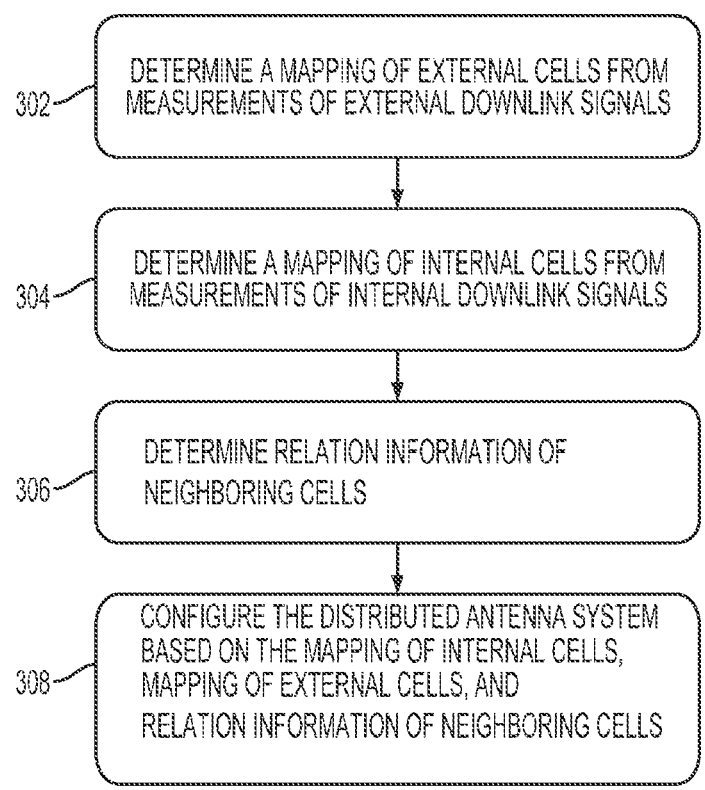
FIG. 3 is a flowchart showing an example of a process for mapping a radio coverage map and configuring a distributed antenna system according to one aspect of the present disclosure.

Configuring a DAS Based on Measurements of External Downlink Signals and Internal Downlink Signals A DAS with a measurement subsystem can identify external cell signals overlapping with internal cell signals as well as internal cell signals overlapping within each other. FIG. 3 is a flowchart depicting a process for identifying the overlapping radio footprints of cells and optimizing the associations of cell IDs in a DAS. In block 302, the OAM-SON unit 120 and the measurement subsystem 118 can determine a mapping of external cells from measurements of external downlink signals. For example, measurement subsystem 118 can perform measurements on external downlink signals detected by the remote units 126a-c that are located within the radio footprint of any external base station To determine the measurements of the external downlink signals, the OAM-SON unit 120 in head-end unit 116 can set all of the remote units 126a-c to a radio-monitoring mode. In the radio monitoring mode, remote units 126a-c can actively monitor over-the-air downlink signals provided by any external base station with an overlapping radio footprint that extends into the DAS, such as the external base station 112. Any remote unit that detects an external downlink signal can provide the external downlink signal to the measurement subsystem 118. The measurement subsystem 118 can measure the external downlink signal by extracting system information parameters from the external downlink signal. System information parameters can include cell IDs and pilot power (e.g., the Reference Signal Received Power in an LTE signal) of the external downlink transmission. The measurement subsystem can provide the system information parameters to the OAM-SON unit 120.

The OAM-SON unit 120 can use the measurements provided by the measurement subsystem to determine a mapping of the external cell detected by the remote units 126a-c. For example, the OAM-SON unit 120 can include a general purpose processor that determines if any of the measured external cell IDs have a pilot power greater than a pre-determined threshold. If a measured external cell ID does have a pilot power greater than a pre-determined threshold, then the OAM-SON unit 120 can store an indication of the measured downlink signal pilot power in a software-implemented database. The OAM-SON unit can store indications of all external cell pilot powers that were detected by remote units 126a-c in a two-dimensional software array in a non-volatile memory or random access memory. The two-dimensional software array can be visualized as a table.

FIG. 4 shows a table that maps the external cell pilot powers detected by each remote unit from FIG. 2. Remote unit 202e can detect the downlink radio signals of external cell 206a. If the detected downlink radio signal is greater than a predetermined threshold, then the OAM-SON unit can indicate the external pilot power that was detected by remote unit 202e in the two-dimensional software array shown In FIG. 4. The OAM-SON unit maps the detected external pilot powers that fall above a predetermined threshold for each remote unit that detects the external downlink signals. The mapping of external cells to remote units can be referred to as an External Cell Mapping Table.

The DAS OAM-SON unit 120 can report the External Cell Mapping Table to the DAS element management system 102. The External Cell Mapping Table can be used to restrict possible internal cell ID selection. For example, the DAS element management system 102 and the operator network management system 104 can refer to the External Cell Mapping Table when selecting internal cell IDs in order to avoid collisions with the detected external cell IDs.

In block 304 of FIG. 3, OAM-SON unit 120 and the measurement subsystem 118 can determine a mapping of internal cells from measurements of internal downlink signals. Internal downlink signals can include downlink signals from base stations communicatively coupled to the distributed antenna system (e.g., internal base stations 106a-b). The internal base stations 106a-b can provide the internal downlink signals to head-end unit 116. The measurement subsystem 118 can measure the internal downlink signals provided to the head-end unit 116 and extract the system information parameters from the internal downlink signals. Similar to the external downlink signals, internal downlink signals can include an identification of the pilot power and the cell ID. The measurement subsystem 118 can provide the measured system information parameters to the OAM-SON unit 120, which can use the system information parameters to determine a mapping of the internal cells. For example, the OAM-SON unit 120 can include a general purpose processor and a memory, discussed above with respect to block 304. If the measured pilot power of the internal signal is greater than a pre-determined threshold, the OAM-SON unit 120 can store an indication of the measured downlink signal pilot power in a software-implemented database in a two-dimensional software array in the memory. The two-dimensional software array mapping internal cells to remote units can be visualized as a table.

FIG. 5 shows a table that maps the internal cell pilot powers associated with the remote units from FIG. 2. For example, remote units 202a-b, 202e are associated with internal cell 204a. Remote units 202c-d are associated with internal cell 204b. And remote unit 202p is associated with internal cell 204d. For each of the remote units 202a-p in the DAS, the OAM-SON unit can indicate the pilot power of the downlink signal from the associated internal cell. The mapping of internal cells associated with remote units can be referred to as an Internal Cell Mapping Table.

In block 306 of FIG. 3, the measurement subsystem 118 and the OAM-SON unit 120 can determine relation information of neighboring cells for each remote unit in the DAS. Neighboring cells can include any cells with radio footprints that overlap with the coverage zone for a given remote unit. To determine the mapping, the OAM-SON unit 120 can set remote units with a given cell ID to detect over-the-air signals radiated by neighboring remote units. For example, for each internal cell ID, the OAM-SON unit 120 can set remote units associated with the internal cell ID to a radio-monitoring mode while remote units mapped to different internal cell IDs radiate downlink signals. In the example shown in FIG. 2, remote units 202a-b, 202e-f, associated with internal cell 204a, can be set to a radio monitoring mode while remote units 202c-d, 202g-h, and 202i-p are set to radiate signals. For each of the remote units 202a-b, 202e-f set to a radio monitoring mode, measurement subsystem 118 can measure the over-the-air signals provided from the radiating remote units 202c-d, 202g-h, and 202i-p and determine if the over-the-air signals have a pilot power greater than a pre-determined threshold. For any detected over-the-air signals that have a pilot power greater than a pre-determined threshold, the radiating signal can come from a neighboring cell. For example, for remote units 202e-f, remote units 202i-j can provide over-the-air signals from neighboring cell #3 204c. The measurement subsystem 118 can provide the measured pilot powers of signals above the pre-determined threshold to the OAM-SON unit 120.

For each remote unit 202a-p, the OAM-SON unit 120 can store an indication of the pilot power levels from any neighboring cells in a two dimensional software array in memory. As the External Cell Relation table indicates which external cells 206a-d are neighboring cells detected by a given remote unit, the OAM-SON unit 120 can store an indication of the pilot power levels of both neighboring internal cells 204a-d and neighboring external cells 206a-c in the software array. FIG. 6 shows a table that indicates neighboring cells (both internal and external) for each remote unit from FIG. 2. The relation information of neighboring cells to remote units can be referred to as a neighboring cell relation table. While FIG. 6 only depicts whether the neighboring cells are internal or external, the neighboring cell relation table can also indicate the measured pilot power levels of the neighboring external cells and internal cells. For example, the OAM-SON unit 120 can store, in the neighboring cell relation table, the measurements of pilot power levels provided from internal cells and external cells as detected by each remote unit in the DAS. The neighboring cell relation table can also include measured parameters related to the detected cells, including Mobile Network Code, Mobile Country Code, technology, channel bandwidth, and frequency.

In some aspects, the operator network management system 104 can update the neighboring cell relation table. By updating the indication of neighboring external and internal cells, hand-in and hand-out procedures for user devices can be smoothly supported by minimizing lost connections during hand-over. For example, the operator network management system 104 can update the neighboring cell relation table in response to changes to the network environment (e.g., with changes to the number of external cells 206a-c detected by remote units 202a-p).

In block 308, the DAS element management system 102 or the operator network management system 104 can configure the DAS and internal base stations based on the information in the External Cell Mapping Table, Internal Cell Mapping Table, and neighboring cell relation table. For example, the operator network management system 104 can configure the DAS and the internal base stations by reconfiguring the selection of internal cell IDs 204a-d assigned to base stations of internal cells 204a-d to avoid conflicting with the external cell IDs 206a-c. In some aspects, the operator network management system 104 can also configure the external base stations associated with external cells 206a-c based on the information in the External Cell Mapping Table, Internal Cell Mapping Table, and neighboring cell relation table. The RAN element management system 100 can send instructions to adjust the cell ID to internal base stations associated with internal cell IDs 204a-c or external base stations associated with external cells 206a-c, accordingly.

In another aspect, the operator network management system 104 can configure the DAS by using the Internal Cell Mapping Table, External Cell Mapping Table, and neighboring cell relation table to determine one or more gating cells associated with remote units located in proximity of pre-determined handover areas to and from external cells. Examples of handover areas include entry points and exit points of a building. A gating cell can include a cell that has a coverage area that overlaps with a neighboring cell. A coverage area for a cell can include the aggregate coverage areas of all remote units within the cell. For example, internal cell 204c has a total coverage area serviced by remote units 202i-j and 202m-n. User devices in motion and moving from the coverage area of one cell to another cell can use a gating cell to seamlessly transition from the first cell to the second cell without dropping on-going communication.

To determine gating cells, the DAS element management system 102 can provide the neighboring cell relation table to the operator network management system 104. The operator network management system 104 can use the information in the neighboring cell relation table to determine which remote units are associated with an internal cell ID and an external cell ID, such that the remote unit is located in an overlapping area of the radio footprints between the external cell and internal cell. For example, remote units 202i, 202m in FIG. 2 can be associated with internal cell 204c as well as external cell 206a. The operator network management system 104 can identify internal cell 204c and external cell 206a as gating cells for user devices that are within the coverage areas of remote units 202i, 202m and optimize the internal cell 204c (e.g., internal base station 106) and external cell 206a (e.g., external base station 112) for handover requests when user devices are moving to and from internal cell 204c and external cell 206a. For example, when user devices are moving from external cell 206a to internal cell 204c, the operator network management system 104 can instruct internal cell 204c (e.g., internal base station 106) to initiate handover procedures as defined by the carrier technology. The operator network management system 104 can synchronize internal cell 204c and the external cell 206a with the packet data being communicated with the user device. Similarly, when a user device is moving from internal cell 204c to external cell 206a, the operator network management system 104 can instruct external cell 206a to initiate handover procedures for the user device.

The internal cell relation table, external cell relation table, and neighboring cell relation table can be created at the commissioning of the DAS and can also be updated on a regular schedule in order to update the DAS configuration in response to a change in the radio environment. For example, when a new neighboring external base station is installed in the RAN, the DAS can automatically and efficiently detect the external base station and the corresponding external cell ID using the aspects discussed herein. The operator network management system 104 can include the new external cell ID in the internal cell relation table, external cell relation table, and neighboring cell relation table and re-configure the DAS based on the updated information.

Figure 8:
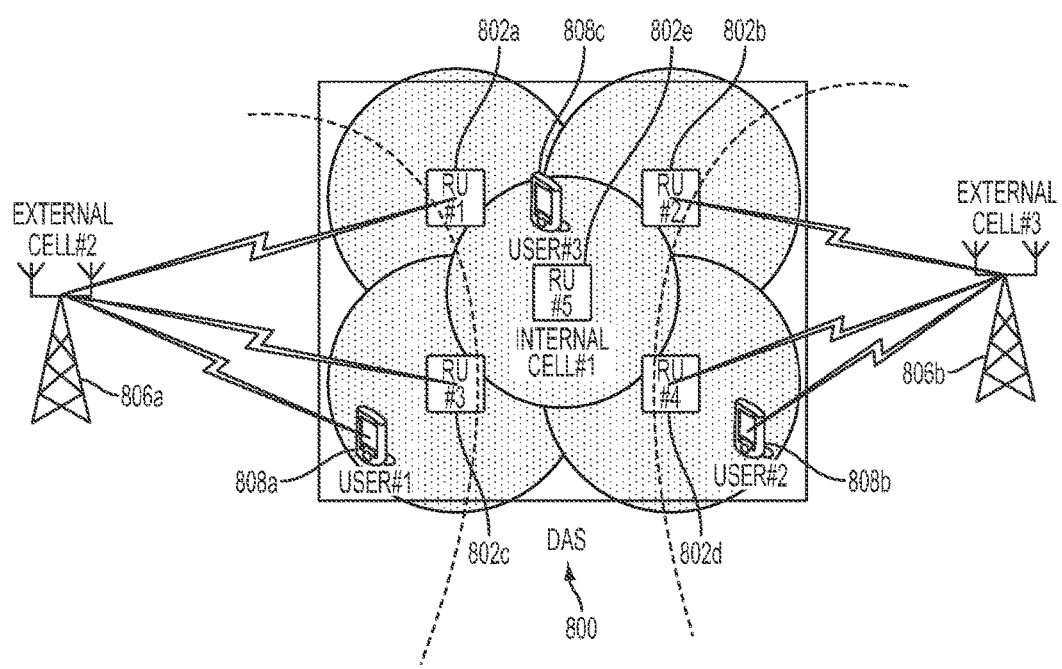
FIG. 8 is a schematic diagram showing an example of a radio coverage map of remote units and user devices in a distributed antenna system.

Generating a Radio Environment Map That Indicates the Relative Positions of User Devices In certain aspects, the pilot power levels indicated in the neighboring cell relation table can be compared with additional pilot power measurements detected by each user device within the coverages area of the DAS. The comparison can be used to generate a radio environment that includes the relative positions of the user devices. For example, FIG. 8 shows an example of three user devices 808a-c positioned in different geographic locations within a DAS 800. The DAS 800 includes five remote units 802a-e communicating with a single internal cell. External cells 806a-b have radio footprints that extend into the DAS 800. Specifically, external cell 806a has a radio footprint that extends into the coverage zones of remote units 802a, 802c, and external cell 806b has a radio footprint that extends into the coverage zones of remote units 802b, 802d. The depicted signal fronts of each external cell 806a-b and the remote units 802a-e are related to a minimum power level threshold that can be detected by the DAS measurement subsystem.

Each user device 808a-c can be located at different positions in the DAS 800 at different times. As depicted in FIG. 8, user devices 808a-b are located at the cell-edge of the internal cell and user device 808c is located at the cell-center of the internal cell. To determine the positions of the user devices 808a-c relative to the remote units 802a-e, the RAN element management system 100 or one of the OAM-SON units 108a-b of the internal base stations 106a-b can compare cell power measurements of downlink signals (e.g., pilot power levels) detected by each user device 808a-c with the pilot power levels detected by each remote unit 802a-e as indicated in the neighboring cell relation table.

For example, the RAN element management system 100 or one of the OAM-SON units 108a-b of internal base stations 106a-b can collect power measurements of downlink signals detected by each user device 808a-c. Additionally, as indicated above, pilot power levels measured at the remote units 802a-e can be stored by the DAS OAM-SON unit 120 in a neighboring cell relation table. A common interface between the components of the DAS 800 and the components of the associated RAN can be used to provide the pilot power levels indicated in the neighboring cell relation table from the DAS 800 to the RAN (e.g., the OAM-SON units 108a-b of internal base stations 106a-b or to the RAN element management system 100). For example, a common interface between the DAS 800 and the RAN can be used to communicate measurements taken by the measurement subsystems 118, 708 (e.g., the neighboring cell relation table, downlink power levels at the remote units 126, etc.) to the RAN.

Figure 9:
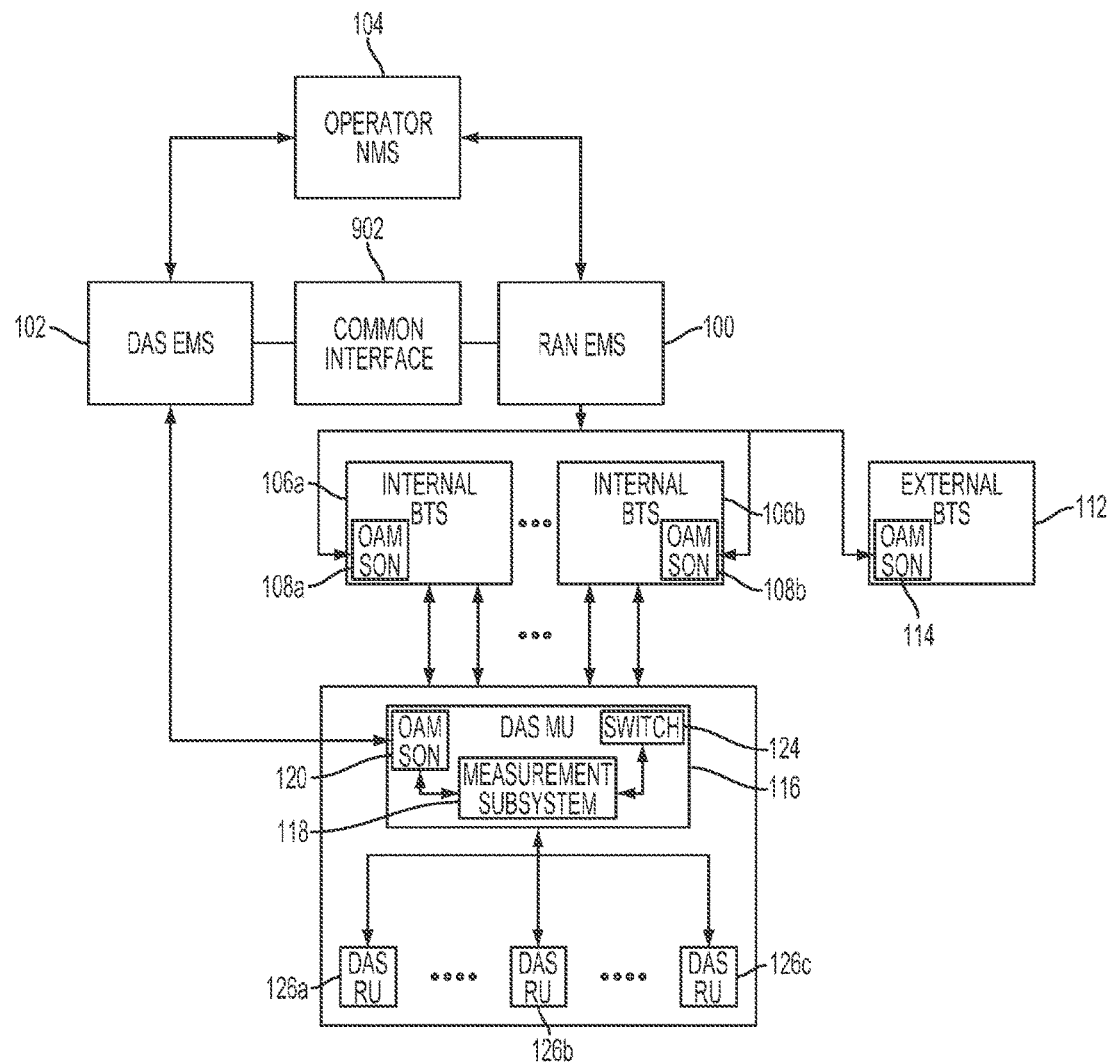
FIG. 9 is a block diagram showing an example of management architecture for a RAN and a DAS with a common interface between a DAS element management system ("EMS") and RAN EMS according to one aspect of the present disclosure.
Figure 10:
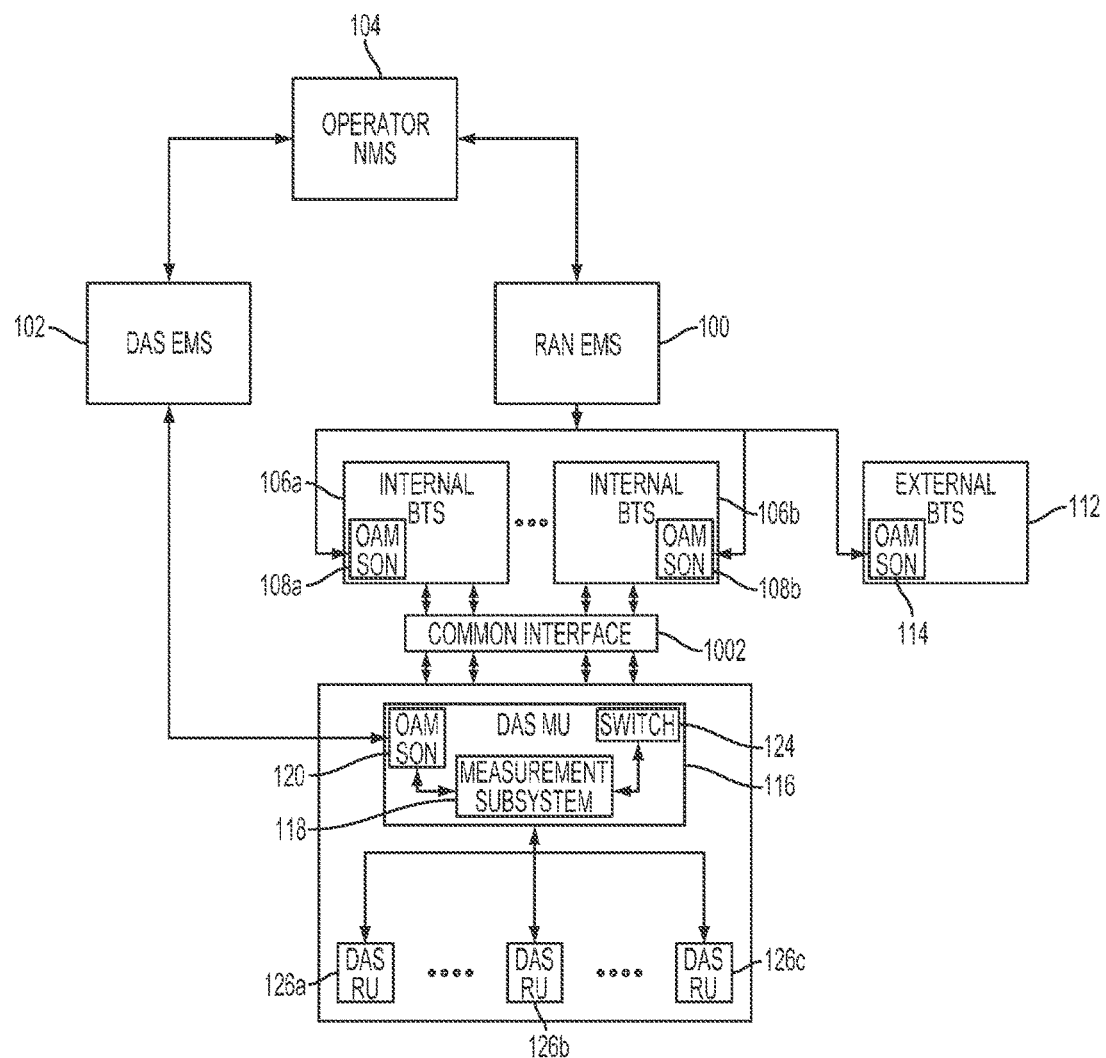
FIG. 10 is a block diagram showing an example of management architecture for a RAN and a DAS with a common interface between internal base stations and the DAS head-end unit according to one aspect of the present disclosure.

Via radio communications protocols, the operator network management system 104, RAN element management system 100, or the internal base stations 106a-b can use the collected power measurements to determine the location of each user device 808a-c relative to the remote units 802a-e. This information can be used to generate a radio coverage map that identifies the locations of user devices 808a-c, which in turn can be used to determine dense areas of wireless traffic in the DAS 800. FIGS. 9-10 depict alternative architectures of a RAN and DAS that include a common interface for communicatively coupling the operations and management subsystems of the DAS and the internal base stations. The common interface allows the DAS OAM-SON unit 120 to provide power measurements taken by the measurement subsystems 118, 708 to the OAM-SON units 108a-b of the internal base stations 106a-b or the RAN element management system 100. While the use of a common interface to couple the RAN and DAS 800 is described with respect to FIG. 8, these alternative architectures including a common interface between the RAN and DAS 800 can be applied to all features described herein.

For example, FIG. 9 depicts a RAN and DAS management architecture similar to the architecture shown in FIG. 1 but with a common interface 902 communicatively coupled to a DAS element management system 102 and a RAN element management system 100. The RAN and DAS management architecture can include an operator network management system 104 communicatively coupled to the DAS element management system 102 and the RAN element management system 100. The architecture can also include a DAS head-end unit 116 communicatively coupled to remote units 126a-c and to internal base stations 106a-b. The RAN element management system 100 can be communicatively coupled to the internal base stations 106a-b as well as external base stations such as external base station 112. As in FIG. 1, the head-end unit 116 can include an OAM-SON unit 120, a switch 124, and a measurement subsystem 118. Each internal base station 106a-b can also include an OAM-SON unit 108a and 108b, and external base station 112 can include OAM-SON unit 114. Each of the components of the RAN and DAS management architecture function in a similar manner to the corresponding components discussed with respect to FIG. 1.

The common interface 902 can include any interface for communicatively coupling the DAS element management system 102 and the RAN element management system 100. For example, the common interface 902 can include an Ethernet interface or a serial interface such as RS-232. The common interface 902 can provide a communication path so that the DAS can transfer measurement parameters to the RAN.

While FIG. 9 depicts the common interface 902 as coupled to the DAS element management system 102 and the RAN element management system 100, the other components of the RAN and DAS can also be connected. For example, FIG. 10 depicts a management architecture similar to the architecture shown in FIGS. 1 and 9. Similar to FIGS. 1 and 9, antenna ports of the internal base stations 106a-b and antenna ports of the DAS head-end unit 116 can be communicatively coupled with an RF interface (e.g., using coaxial cables). In addition, the OAM-SON units 108a-b of internal base stations 106a-b, respectively, can be communicatively coupled to the OAM-SON unit 120 of head-end unit 116 using a common interface 1002. The RAN and DAS management architecture in FIG. 10 can include an operator network management system 104 communicatively coupled to a DAS element management system 102 and a RAN element management system 100. The architecture can also include a DAS head-end unit 116 communicatively coupled to remote units 126a-c and to internal base stations 106a-b. The RAN element management system 100 can be communicatively coupled to the internal base stations 106a-b as well as external base stations such as external base station 112. As in FIGS. 1 and 9, the head-end unit 116 can include an OAM-SON unit 120, a switch 124, and a measurement subsystem 118. Each internal base station 106a-b can also include an OAM-SON unit 108a and 108b, and external base station 112 can include OAM-SON unit 114. Each of the components of the RAN and DAS management architecture 100, 102, 104, 106a-b, 108a-b, 112, 114, 116, 118, 120, 124, 126a-c function in a similar manner to the corresponding components discussed with respect to FIG. 1.

Figure 11:
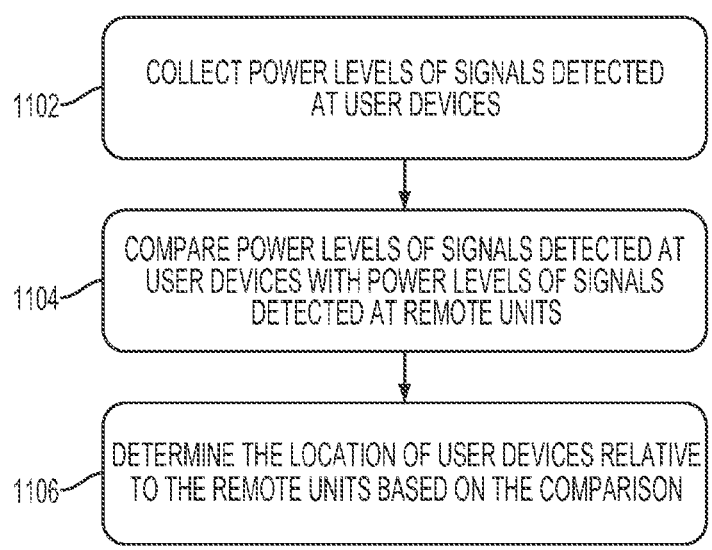
FIG. 11 is a flowchart showing an example of a process for determining a radio coverage map of user devices in a DAS according to one aspect of the present disclosure according to one aspect of the present disclosure.

The interface between the RAN and the DAS, such as the common interface 902 or the common interface 1002, can be used to provide power level measurements collected by the measurement subsystem 118 (e.g., downlink signal pilot power levels of remote units as indicated in the neighboring cell relation table) from the DAS to the RAN. The OAM-SON units 108a-b of the internal base stations 106a-b or the RAN element management system 100 can determine a radio coverage map by comparing the collected user device power level measurements with power level measurements indicated in the neighboring cell relation table determined by the OAM-SON unit 120. FIG. 11 is a flowchart describing a process for determining a radio coverage map and determining the relative positions of the user devices.

In block 1102, OAM-SON units 108a-b or the RAN element management system 100 collect power levels of downlink signals detected at user devices. For example, user devices can routinely determine pilot power levels of the downlink signals and provide the pilot power levels to components of the RAN, as part of standard signaling protocols. For example, according to Radio Resource Control signaling protocols, user devices can provide power level measurements of downlink pilot signals to components of the RAN as part of a cell measurement report procedure. The OAM-SON units 108a-b or the RAN element management system 100 can compile the measurements collected from the RAN in a two-dimensional data structure mapping the pilot power level detected at each user device at each cell. For example, FIG. 12 is a table mapping the pilot power levels detected by each user device shown in FIG. 8 for each cell in FIG. 8. User device 808a detected and measured a pilot power level of −90 decibels from the internal cell. User devices 808b-c detected and measured pilot power levels of −90 decibels and −85 decibels, respectively, from the internal cell. Each of the user devices 808a-c also detected and measured pilot power levels provided by external cells 806a-b. For example, pilot signals provided from external cell 806a were measured at −95 decibels at user device 808a, −125 decibels at user device 808b, and −125 decibels at user device 808c. Pilot signals provided from external cell 806b were measured with power levels at 125 decibels at user device 808a, 95 decibels at user device 808b, and −125 decibels at user device 808c.

Additionally, downlink pilot power measurements measured at the remote units 802a-c (e.g., downlink power measurements indicated in a neighboring cell relation table) can be provided from the DAS to the RAN via a common interface 902. For example, the power levels of the pilot signals detected at the remote units in the DAS can be provided from the neighboring cell relation table discussed above with respect to FIG. 6. For example, the OAM-SON unit 120 in the head-end unit 116 can generate the neighboring cell relation table, which indicates the pilot power levels of each internal and external detected by each remote unit in the DAS. The OAM-SON unit 120 can provide the neighboring cell relation table to the RAN element management system 100 via the common interface 902. Alternatively, the OAM-SON unit 120 can provide the neighboring cell relation table to the OAM-SON units 108a-b of the internal base stations 106a-b via the common interface 1002.

FIG. 13 shows a neighboring cell relation table for remote units 802a-e shown in FIG. 8. Pilot signals provided from external cell 806 detected by remote unit 802a are measured at −110 decibels. Pilots signals provided from external cell 806a detected by remote units 802b, 802c, 802d, and 802e are measured at −125 decibels, −100 decibels, −125 decibels, and −125 decibels, respectively. Pilot signals from external cell 806b are measured and indicated for each remote unit 802a-e.

In block 1104, the RAN element management system 100 or the OAM-SON units 108a-b of internal base stations 106a-b can compare power levels of the pilot signals detected at the user devices with power levels of pilot signals detected at remote units. For example, the RAN element management system 100 or the OAM-SON units 108a-b can compare the power levels detected at the user devices and the power levels detected at the remote units by taking a difference of the power levels. FIG. 14 shows a table mapping the difference in pilot power levels detected by remote units 802a-e and by user devices 808a-c. For example, external cell 806a provides a pilot signal that is measured by the remote unit 802a and by the user device 808a. The difference between the pilot power measured at remote unit 802a and the pilot power measured at user device 808a is (−95)-(−110) decibel-milliwatts (dBm). External cell 806b provides a pilot signal that is measured by the remote unit 802a and the user device 808a. The difference between the measured power levels of the pilot signal from external cell 806b as detected by remote unit 802a and user device 808a is (−125)-(−125) decibels. FIG. 14 shows a similar comparison of pilot power levels provided from external cells 806a-b as detected by each remote unit 802a-e and by each user device 808a-c.

In block 1106, the RAN element management system 100 or the OAM-SON units 108a-b can determine the location of the user devices 808a-c relative to the remote units 802a-e by using the comparisons of the pilot signal power levels. Positions of the user devices 808a-c can be determined using a maximum likelihood criterion. For example, if pilot the power level from a neighboring external cell measured at a remote unit and the pilot power level from the same neighboring external cell measured at the user device are similar, then the comparison can indicate that the user device is close in proximity to the remote unit and at the cell-edge of the external cell. If the pilot power level measured at a remote unit and a user device are different, then the comparison can indicate that the user device is located away from the remote unit. Comparing the differences in measured power levels across each user device can allow the DAS element management system 102 or the RAN element management system 100 to determine a radio coverage map of the user devices, estimating the position of each user device relative to each remote unit.

For example, returning to FIG. 14, comparing the differences in power levels across each user device 808a-c shows which user devices 808a-c are closer to each of the remote units 802a-e. Table cell 1402, which lists the lowest differences in power levels for user device 808a, indicates that user device 808a is closest in proximity to remote unit 802c. Table cell 1404 indicates that user device 808b is closest in proximity to remote unit 802d. Table cell 1406 indicates that user device 808c is closest in proximity to remote unit 802e.

Power and Carrier Frequency Allocations to Outer Remote Units

In some aspects, external cells 206a-c can cause signal interference to remote units that fall within the coverage zones of both external cells 206a-c and internal cells 204a-d due to conflicting frequency bands. For example, remote units 202e, 202i, 202m located at the edges of the DAS can receive interfering signals of conflicting frequency bands from external cell 206a. Similarly, remote units 202o, 202p, 202L located at the edges of the DAS can receive interfering signals of conflicting frequency bands from external cell 206c. Based on signal interference from external cells 206a-c, the DAS OAM-SON unit 120 can modify the selection of carrier frequencies allocated to remote units on the edges of internal cells (outer remote units). For example, outer remote units can be located close to the windows of a building and thus susceptible to interference from signals from external cells 206a-c leaking into the building. Outer remote units can detect interference from external cells by measuring pilot powers of specific external cells 206a-c for a given carrier frequency. Power measurements above a pre-defined threshold can indicate high signal interference from the external cell for the measured carrier frequency.

As an example, remote unit 202m, which can be an outer remote unit, can be affected with high signal interference due to signals from external cell 206a. A measurement subsystem within the remote unit 202m can determine the signal-to-interference ratio of incoming downlink signals from internal cell 204c and provide the signal-to-interference ratio to the head-end unit 116. In another aspect, the measurement subsystem 118 within head-end unit 116 can measure the signal-to-interference ratio of downlink signals from internal cell 204c. A low signal-to-interference ratio can indicate conflicting signals on the same carrier frequency from external cell 206a. In response, the DAS OAM-SON unit 120 can allocate fewer carrier signals to remote units affected by high external cell signal interference. Carrier signals allocated to remote units affected by high signal interference can be reduced by, for example, allocating a fewer number of internal cells 204a-c to the affected remote units. For a given composite power available at the remote unit, fewer carriers per remote unit can result in higher power per carrier frequency. By reducing the number of carriers allocated to remote unit 202m (the remote unit affected by high external cell interference), remote unit 202m can have better power dominance over any external interference due to signals from external cell 206a.

By reducing the number of carriers allocated per selected remote units, total power per channel can be increased as total available transmit power is used on fewer channels. Reducing the number of carriers allocated to outer remote units in a building can help keep indoor cell dominance over the interference from external cells 206a-c leaking into the building.

Additionally, the DAS OAM-SON unit 120 can optimize the DAS by avoiding allocating the same carrier frequencies as used by external cells 206a-c on specific remote units affected by interference by that frequency. For example, if remote unit 202m detects high signal interference due to signals from external cell 206a on carrier frequency X, OAM-SON unit 120 can avoid allocating carrier frequency X to remote unit 202m. If external cell 206a is emitting interfering signals from two carrier frequencies X and Y, then OAM-SON unit 120 can allocate one interfering carrier frequency X or Y to remote unit 202m. By omitting one of the interfering carrier frequencies, the total available power on the allocated carrier frequency will be higher due to reduced power sharing with the omitted carrier. In some aspects, an outer remote unit can detect very large signal interference (e.g., above a pre-determined threshold) from external cells 206a-c. In response, the OAM-SON unit 120 can allocate a carrier frequency to the affected outer remote units that is different from the interfering carrier frequency. Thus, in cases of very large signal interference from external cells 206a-c, outer remote units within the DAS can be allocated carrier frequencies not used by external cells 206a-c.

The decision on the number of carrier frequencies to be allocated on specific remote units can be driven by interference power thresholds, which the DAS OAM-SON unit 120 can define for each frequency. If a first interference power threshold is exceeded by signal interference from external cells 206a-c, then the OAM-SON unit 120 can avoid allocating one of the interfering carrier frequencies. If a higher second interference power threshold is exceeded by signal interference from an external cell 206*a-c*, then the DAS OAM unit 120 can avoid allocating multiple interfering carrier frequencies as used by external cells 206*a-c*.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations or additions to the present subject matter as would be readily apparent to one of ordinary skill in the art.

What is claimed is:

1. A method, comprising:
   determining a mapping of external cells from measurements of external downlink signals received by a remote unit of a distributed antenna system, the remote unit providing wireless communication within a coverage zone;
   determining a mapping of internal cells from measurements of internal downlink signals provided by base stations communicatively coupled to a head-end unit of the distributed antenna system;
   determining relation information of neighboring cells that include radio footprints that overlap with the coverage zone of the remote unit; and
   configuring the distributed antenna system and the base stations based on the mapping of external cells, the mapping of internal cells, and the relation information of neighboring cells.

2. The method of claim 1, wherein the measurements of external downlink signals include external cell identifiers, a mobile country code, a mobile network code, a type of carrier technology, a signal bandwidth, a signal frequency, and power levels of downlink pilot signals.

3. The method of claim 2, wherein external cells include cells associated with additional base stations not communicatively coupled to the distributed antenna system, wherein internal cells include cells associated with the base stations communicatively coupled to the head-end unit, and wherein determining the mapping of external cells comprises indicating, in an external cell mapping table, the power levels of downlink pilot signals if the power levels of downlink pilot signals are greater than a pre-determined threshold.

4. The method of claim 1, wherein configuring the distributed antenna system includes adjusting an allocation of internal cell identifiers to avoid conflicting with external cell identifiers indicated by the mapping of the external cell identifiers.

5. The method of claim 1, wherein configuring the distributed antenna system includes determining a gating cell associated with the remote unit, wherein the remote unit is located in an overlapping area within a first radio footprint and a second radio footprint.

6. The method of claim 1, further comprising revising the mapping of external cells, the mapping of internal cells, and the relation information of neighboring cells in response to a change in a radio environment of the distributed antenna system.

7. The method of claim 1, further comprising:
   collecting signal power measurements of pilot signals, the signal power measurements performed by a user device within the coverage zone;
   comparing the signal power measurements with neighboring cell signal power measurements indicated in the relation information of the neighboring cells; and
   determining a radio environment map estimating a position of the user device with respect to the remote unit.

8. A head-end unit, comprising:
   a measurement subsystem configured to measure external downlink signals detected by a remote unit of a distributed antenna system and measure internal downlink signals provided from an internal base station communicatively coupled to the distributed antenna system; and
   an operation and management system configured to (i) determine, from the external downlink signals, a mapping of external cells detected by the remote unit, (ii) determine, from the internal downlink signals, a mapping of internal cells, and (iii) determine relation information of neighboring cells that include radio footprints that overlap with a coverage zone of the remote unit,
   wherein the head-end unit is configured to provide wireless communication from the internal base station to the remote unit of the distributed antenna system.

9. The head-end unit of claim 8, wherein the measurement subsystem is configured to measure the external downlink signals by determining external downlink signal power levels and external cell identifiers and wherein the measurement subsystem is configured to measure the internal downlink signals by determining internal downlink signal power levels and internal cell identifiers.

10. The head-end unit of claim 9, wherein the operation and management system is configured to determine the mapping of external cells by indicating, in an external cell mapping table, the external downlink signal power levels if the external downlink signal power levels are greater than a pre-determined threshold.

11. The head-end unit of claim 8, wherein the operation and management system is further configured to provide the mapping of external cells, the mapping of internal cells, and the relation information of neighboring cells to an operator network management system, and wherein the operator network management system is configured to optimize the distributed antenna system by adjusting an allocation of internal cell identifiers to avoid conflicting with external cell identifiers indicated by the mapping of external cells.

12. The head-end unit of claim 8, wherein the operation and management system is further configured to provide the mapping of external cells, the mapping of internal cells, and the relation information of neighboring cells to an element management system, and wherein the element management system is configured to optimize the distributed antenna system by sending, to an operator network management system, instructions for adjusting an allocation of internal cell identifiers to avoid conflicting with external cell identifiers indicated by the mapping of external cells.

13. The head-end unit of claim 8, wherein the operation and management system is further configured to provide the mapping of external cells, the mapping of internal cells, and the relation information of neighboring cells to an element management system, wherein the element management system is configured to optimize the distributed antenna system by determining a gating cell associated with the remote unit, and wherein the remote unit is located in an overlapping area within a first radio footprint and a second radio footprint.

14. The head-end unit of claim 8, wherein the operation and management system is further configured to collect signal power measurements for pilot signals detected by user devices, compare the signal power measurements with neighboring cell signal power measurements indicated in the mapping of the neighboring cells, and determine a radio environment map estimating positions of the user devices within the distributed antenna system.

15. A distributed antenna system, comprising:
one or more remote units configured to provide wireless communication to user devices within a coverage zone; and
a head-end unit communicatively coupled to the one or more remote units, the head-end unit including an operation and management system configured to determine a mapping of external cells, a mapping of internal cells, and relation information of neighboring cells for each remote unit in the distributed antenna system and provide the mapping of external cells, the mapping of internal cells, and the relation information of neighboring cells to an element management system communicatively coupled to the head-end unit,
wherein the element management system is configured to optimize the distributed antenna system based on the mapping of external cells, the mapping of internal cells, and the relation information of neighboring cells.

16. The distributed antenna system of claim 15, wherein the element management system is configured to optimize the distributed antenna system by sending, to an operator network management system, instructions for adjusting an allocation of internal cell identifiers to avoid conflicting with external cell identifiers indicated by the mapping of external cells.

17. The distributed antenna system of claim 15, wherein each of the one or more remote units include a measurement subsystem configured to measure internal downlink signals and external downlink signals and provide measurements of the internal downlink signals and measurements of the external downlink signals to the head-end unit.

18. The distributed antenna system of claim 17, wherein the measurements of the internal downlink signals include internal downlink signal power levels and internal cell identifiers and the wherein the measurements of the external downlink signals include external downlink signal power levels and external cell identifiers.

19. The distributed antenna system of claim 15, wherein the distributed antenna system is communicatively coupled to a radio access network configured to collect downlink signal power levels of pilot signals detected at the user devices within the coverage zone, compare the downlink signal power levels with neighboring cell signal power measurements indicated in the relation information of neighboring cells, and determine a radio environment map for estimating positions of the user devices within the distributed antenna system.

20. The distributed antenna system of claim 19, wherein the radio environment map indicates, for each of the one or more remote units, relative positions of the user devices.

* * * * *